US006616891B1

United States Patent
Sapru et al.

(10) Patent No.: US 6,616,891 B1
(45) Date of Patent: Sep. 9, 2003

(54) HIGH CAPACITY TRANSITION METAL BASED HYDROGEN STORAGE MATERIALS FOR THE REVERSIBLE STORAGE OF HYDROGEN

(75) Inventors: Krishna Sapru, Troy, MI (US); Zhaosheng Tan, Troy, MI (US); Mohamed Bazzi, Dearborn Heights, MI (US); Subramanian Ramachandran, Milton, WA (US); Stanford R. Ovshinsky, Bloomfield Hills, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 10/247,536

(22) Filed: Sep. 18, 2002

(51) Int. Cl.[7] ............................................... C22C 14/00
(52) U.S. Cl. ........................ 420/421; 148/421; 148/423
(58) Field of Search ................. 148/421, 423; 420/421

(56) References Cited

U.S. PATENT DOCUMENTS 5,968,291 A * 10/1999 Iba et al. .................... 148/421

FOREIGN PATENT DOCUMENTS

JP         11106859 A  *  4/1999  ............ C22C/30/00

* cited by examiner

Primary Examiner—John Sheehan
Assistant Examiner—Andrew L. Oltmans
(74) Attorney, Agent, or Firm—Frederick W. Mau, II; Marvin S. Siskind

(57) ABSTRACT

A reversible hydrogen storage alloy capable of absorbing approximately 4 weight percent hydrogen and desorbing up to 2.8 weight percent hydrogen at temperatures up to 100° C. The hydrogen storage alloy is generally composed of titanium, vanadium, chromium, and manganese. Additional elements such as zirconium, yttrium, iron, nickel, zinc, molybdenum, and tantalum may also be included in the alloy.

24 Claims, 4 Drawing Sheets

HIGH CAPACITY TRANSITION METAL BASED HYDROGEN STORAGE MATERIALS FOR THE REVERSIBLE STORAGE OF HYDROGEN

FIELD OF THE INVENTION

The present invention relates to hydrogen storage alloys utilized for the reversible storage of hydrogen. More particularly, the present invention relates to a hydrogen storage alloy capable of storing about 4 wt. % hydrogen and delivering reversibly up to 2.8 wt. % hydrogen at temperatures up to 150° C.

BACKGROUND

Hydrogen storage is a technology critical to a wide variety of applications, some of the most prevalent being fuel cells, portable power generation, and hydrogen combustion engines. Such applications would benefit substantially from hydrogen storage alloys capable of absorbing and desorbing higher amounts of hydrogen as compared to present day commercially available hydrogen storage alloys. Hydrogen storage alloys having the hydrogen absorption and desorption characteristics of the present invention will benefit such applications by providing longer operating life and/or range on a single charge for hydrogen power generators, fuel cells, and hydrogen internal combustion engines.

In the past considerable attention has been given to the use of hydrogen as a fuel or fuel supplement. While the world's oil reserves are being rapidly depleted, the supply of hydrogen remains virtually unlimited. Hydrogen can be produced from coal, natural gas and other hydrocarbons, or formed by the electrolysis of water. Moreover hydrogen can be produced without the use of fossil fuels, such as by the electrolysis of water using nuclear or solar energy. Furthermore, hydrogen, although presently more expensive than petroleum, is a relatively low cost fuel. Hydrogen has the highest density of energy per unit weight of any chemical fuel and is essentially non-polluting since the main by-product of burning hydrogen is water.

While hydrogen has wide potential application as a fuel, a major drawback in its utilization, especially in mobile uses such as the powering of vehicles, has been the lack of acceptable lightweight hydrogen storage medium. Conventionally, hydrogen has been stored in a pressure-resistant vessel under a high pressure or stored as a cryogenic liquid, being cooled to an extremely low temperature. Storage of hydrogen as a compressed gas involves the use of large and heavy vessels. In a steel vessel or tank of common design only about 1% of the total weight is comprised of hydrogen gas when it is stored in the tank at a typical pressure of 136 atmospheres. In order to obtain equivalent amounts of energy, a container of hydrogen gas weighs about thirty times the weight of a container of gasoline. Additionally, transfer is very difficult, since the hydrogen is stored in a large-sized vessel. Furthermore, storage as a liquid presents a serious safety problem when used as a fuel for motor vehicles since hydrogen is extremely flammable. Liquid hydrogen also must be kept extremely cold, below −253° C., and is highly volatile if spilled. Moreover, liquid hydrogen is expensive to produce and the energy necessary for the liquefaction process is a major fraction of the energy that can be generated by burning the hydrogen.

Alternatively, certain metals and alloys have been known to permit reversible storage and release of hydrogen. In this regard, they have been considered as a superior hydrogen-storage material, due to their high hydrogen-storage efficiency. Storage of hydrogen as a solid hydride can provide a greater volumetric storage density than storage as a compressed gas or a liquid in pressure tanks. Also, hydrogen storage in a solid hydride presents fewer safety problems than those caused by hydrogen stored in containers as a gas or a liquid. Solid-phase metal or alloy system can store large amounts of hydrogen by absorbing hydrogen with a high density and by forming a metal hydride under a specific temperature/pressure or electrochemical conditions, and hydrogen can be released by changing these conditions. Metal hydride systems have the advantage of high-density hydrogen-storage for long periods of time, since they are formed by the insertion of hydrogen atoms to the crystal lattice of a metal. A desirable hydrogen storage material must have a high storage capacity relative to the weight of the material, a suitable desorption temperature/pressure, good kinetics, good reversibility, resistance to poisoning by contaminants including those present in the hydrogen gas, and be of a relatively low cost. If the material fails to possess any one of these characteristics it will not be acceptable for wide scale commercial utilization.

The hydrogen storage capacity per unit weight of material is an important consideration in many applications, particularly where the hydride does not remain stationary. A low hydrogen storage capacity relative to the weight of the material reduces the mileage and hence the range of a hydrogen fueled vehicle making the use of such materials. A low desorption temperature is desirable to reduce the amount of energy required to release the hydrogen. Furthermore, a relatively low desorption temperature to release the stored hydrogen is necessary for efficient utilization of the available exhaust heat from vehicles, machinery, fuel cells, or other similar equipment.

Good reversibility is needed to enable the hydrogen storage material to be capable of repeated absorption-desorption cycles without significant loss of its hydrogen storage capabilities. Good kinetics are necessary to enable hydrogen to be absorbed or desorbed in a relatively short period of time. Resistance to contaminants to which the material may be subjected during manufacturing and utilization is required to prevent a degradation of acceptable performance.

The prior art hydrogen storage materials include a variety of metallic materials for hydrogen-storage, e.g., Mg, Mg—Ni, Mg—Cu, Ti—Fe, Ti—Mn, Ti—Ni, Mm—Ni and Mm—Co alloy systems (wherein, Mm is Misch metal, which is a rare-earth metal or combination/alloy of rare-earth metals). None of these prior art materials, however, has had all of the properties required for a storage medium with widespread commercial utilization.

Of these materials, the Mg alloy systems can store relatively large amounts of hydrogen per unit weight of the storage material. However, heat energy must be supplied to release the hydrogen stored in the alloy, because of its low hydrogen dissociation equilibrium pressure at room temperature. Moreover, release of hydrogen can be made, only at a high temperature of over 250° C. along with the consumption of large amounts of energy.

The rare-earth (Misch metal) alloys have their own problems. Although they typically can efficiently absorb and release hydrogen at room temperature, based on the fact that it has a hydrogen dissociation equilibrium pressure on the order of several atmospheres at room temperature, their hydrogen-storage capacity per unit weight is lower than any other hydrogen-storage material.

The Ti—Fe alloy system which has been considered as a typical and superior material of the titanium alloy systems, has the advantages that it is relatively inexpensive and the hydrogen dissociation equilibrium pressure of hydrogen is several atmospheres at room temperature. However, since it requires a high temperature of about 350° C. and a high pressure of over 30 atmospheres, for initial hydrogenation, the alloy system provides relatively low hydrogen absorption/desorption rate. Also, it has a hysteresis problem which hinders the complete release of hydrogen stored therein.

Under the circumstances, a variety of approaches have been made to solve the problems of the prior art and to develop an improved material which has a high hydrogen-storage efficiency, a proper hydrogen dissociation equilibrium pressure and a high absorption/desorption rate.

The hydrogen storage alloys of the present invention are capable of storing about 4 wt. % hydrogen and delivering reversibly up to 2.8 wt. % hydrogen at temperatures up to 150° C. These hydrogen storage alloys allow fuel cells and other hydrogen applications to continue operating for longer periods of time without need for recharging as compared to the present day hydrogen storage alloys. Furthermore, the hydrogen storage alloys of the present invention are able to desorb a substantial amount of hydrogen without the need for extremely high temperatures.

SUMMARY OF THE INVENTION

The present invention discloses hydrogen storage alloys capable of storing approximately 4 wt. % hydrogen and delivering reversibly up to 2.8 wt. % hydrogen at temperatures up to 150° C. from the alloy. The hydrogen storage alloy may be generally composed of titanium, vanadium, chromium, and manganese. Titanium is present preferably within the range of 29–54 atomic percent titanium, most preferably in the range of 30–35 atomic percent. Vanadium is present preferably within the range of 5–45 atomic percent, most preferably within the range of 25–30 percent. Chromium is present preferably within the range of 15–50 atomic percent, most preferably within the range of 25–30 atomic percent. Manganese is present preferably within the range of 0–18 atomic percent manganese, most preferably between the range of 10–15 atomic percent.

The hydrogen storage alloy of the present invention may also include one or more elements selected from zirconium, yttrium, iron, nickel, zinc, molybdenum, and tantalum. Such elements may be included in the hydrogen storage alloy in the range of 0–22 atomic percent.

DETAILED DESCRIPTION OF THE INVENTION

Figure 1:
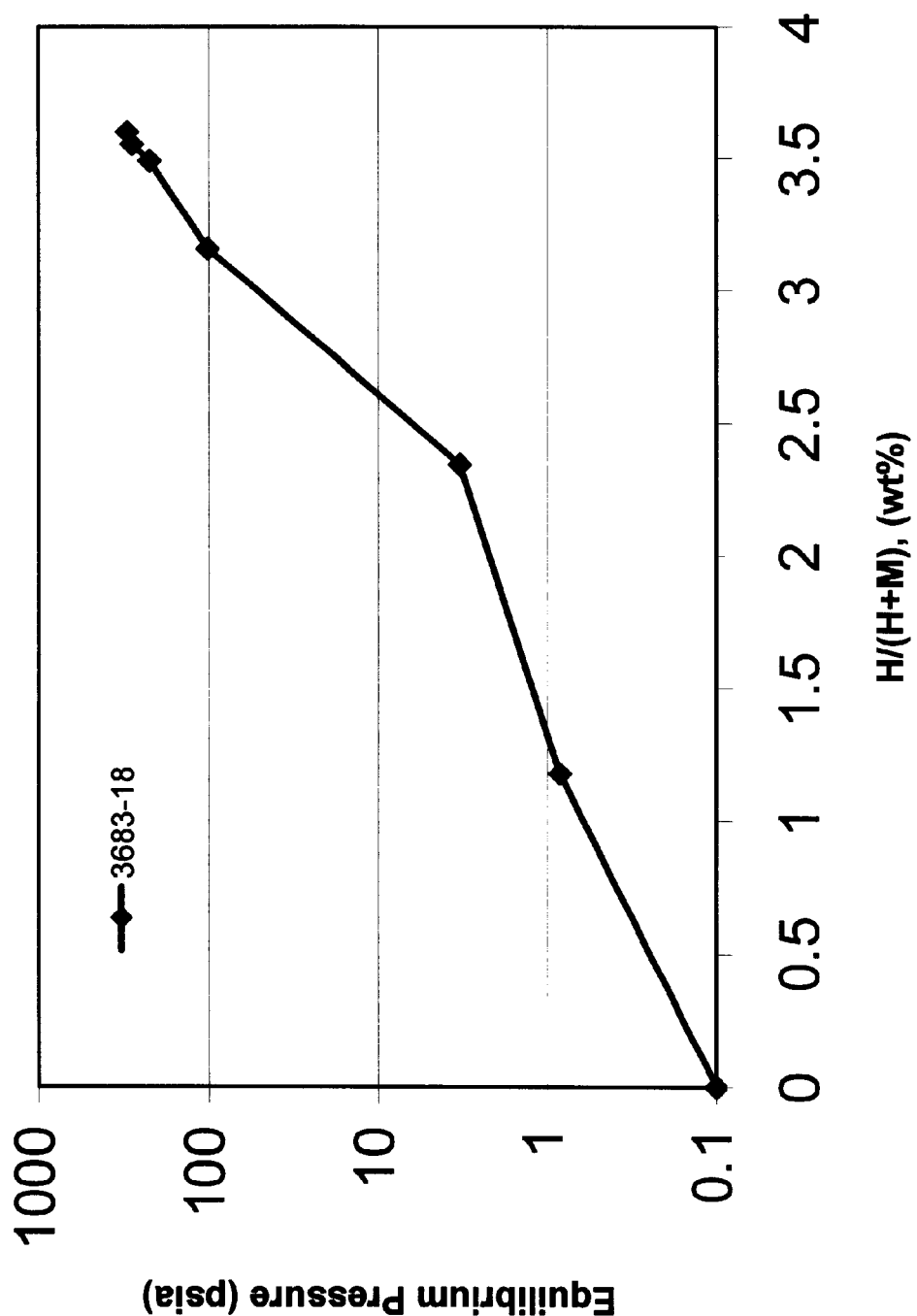
FIG. 1, shows an Pressure-Composition-Temperature (PCT) graph for the hydrogen storage alloy 3683-18 of the present invention.

The present invention discloses a hydrogen storage alloys capable of storing approximately 4 wt. % hydrogen and delivering reversibly up to 2.8 wt. % hydrogen at temperatures up to 150° C. from the alloy. The hydrogen storage alloy may be generally composed of titanium, vanadium, chromium, and manganese. Titanium is present preferably within the range of 29–54 atomic percent titanium, most preferably in the range of 30–35 atomic percent. Vanadium is present preferably within the range of 5–45 atomic percent, most preferably within the range of 25–30 percent. Chromium is present preferably within the range of 15–50 atomic percent, most preferably within the range of 25–30 atomic percent. Manganese is present preferably within the range of 0–18 atomic percent manganese, most preferably between the range of 10–15 atomic percent.

The hydrogen storage alloy of the present invention may also include one or more elements selected from zirconium, yttrium, iron, nickel, zinc, molybdenum, and tantalum. Such elements may be included in the hydrogen storage alloy in the range of 0–22 atomic percent. Preferred alloys of the present invention are shown in Table 1 with corresponding absorption and desorption capacities.

TABLE 1

| Alloy # | Ti | Zr | Y | V | Cr | Mn | Fe | Ni | Zn | Mo | Ta | Absorption capacity (Wt % $H_2$) | Description Capacity (Wt % $H_2$) 25° C. | 80° C. | 100° C. | 150° C. |
|---|---|---|---|---|---|---|---|---|---|---|---|---|---|---|---|---|
| cta7 | 34.88 | | | 28.5 | 27.92 | | 8.69 | | | | | 3.47 | 0.83 | 2.18 | | |
| cta22 | 34.49 | | | 27.58 | 27.9 | 5.92 | 4.38 | | | | | 3.04 | 0.79 | | 1.69 | |
| cta48 | 33.34 | | | 16.98 | 46.67 | | | | 2.99 | | | 3.33 | 0.9 | | 2 | |
| cta51 | 33.35 | | | 39.96 | 20 | | | 6.67 | | | | 3.55 | 0.2 | | 1.23 | 2.1 |
| cta52 | 33.34 | | | 39.98 | 20 | | | | 6.66 | | | 3.66 | 0.24 | | 1.13 | 2.1 |
| cta53 | 33.34 | | | 39.98 | 20 | 6.66 | | | | | | 3.62 | 0.2 | | 1.93 | |
| cta59 | 33.86 | | | 17.24 | 39.73 | | | 9.14 | | | | 3.11 | 0.61 | | 1.53 | |
| cta61 | 36.06 | 21.62 | | 21.62 | 31.47 | | | | | | | 3.09 | 0.52 | | 1.46 | |
| cta70 | 49.97 | | | 6.74 | 30.45 | | | 2.82 | | | | 4.01 | 0.13 | | 0.62 | |
| cta72 | 49.78 | | | 16.68 | 27.7 | 5.82 | | | | | | 4.01 | 0.14 | | 0.64 | |
| cta74 | 38.83 | | | 15.52 | 35.12 | | 7.9 | 2.61 | | | | 3.07 | 0.61 | | | 1.78 |
| cta81 | 31.94 | | | 22.02 | 38.51 | 4.64 | | 0.09 | | | | 3.16 | 0.7 | | 1.79 | |
| 3683-16 | 33.07 | | | 27.74 | 27.57 | 9.75 | | | | | | 3.98 | | | | 2.38 |
| 3683-17 | 34.94 | | | 27.76 | 27.58 | 6.39 | 3.32 | | | | | 2.87 | 0.2 | | 2.12 | |
| 3683-18 | 33.55 | | | 26.64 | 26.56 | 13.24 | | | | | | 3.8 | 0.2 | 1.68 | 2.23 | 2.54 |
| 3683-20 | 33.05 | | 2 | 26.14 | 26.05 | 12.74 | | | | | | 3.73 | 0.26 | | 1.84 | |
| 3683-21 | 37.03 | | | 22.23 | 29.6 | | | | | | | 3.91 | 0.2 | | 1.96 | |
| 3683-22 | 36.35 | | | 20.06 | 33.32 | | | | | | | 3.71 | 0.21 | | 1.82 | 2.18 |
| 3683-31 | 32.98 | | | 26.18 | 26 | | | | | | | 3.91 | | | 2.39 | 2.77 |

TABLE 1-continued

| Alloy # | Ti | Zr | Y | V | Cr | Mn | Fe | Ni | Zn | Mo | Ta | Absorption capacity (Wt % H$_2$) | Description Capacity (Wt % H$_2$) | | | |
|---|---|---|---|---|---|---|---|---|---|---|---|---|---|---|---|---|
| | | | | | | | | | | | | | 25° C. | 80° C. | 100° C. | 150° C. |
| 3683-32 | 34.19 | | | 27.16 | 26.99 | | | | | | | 3.87 | | | 2.08 | |
| 3683-35 | 38.46 | | | 30.76 | 30.76 | | | | | | | 4.07 | | | 1.05 | |
| 3683-37 | 31.95 | | | 25.56 | 25.56 | 14.95 | | | | | 1.96 | 3.49 | | | 2.16 | |
| 3683-38 | 32.8 | | | 26.05 | 25.88 | 14.76 | | | | 0.5 | | 3.93 | | 2.13 | 2.62 | |
| 3683-41 | 32.13 | | | 25.7 | 25.7 | 14.45 | | | | 2 | | 3.63 | | | 2.58 | 2.69 |
| 3683-49 | 32.76 | | | 26.01 | 25.85 | 14.77 | | | | 0.59 | | 4.18 | | 2.37 | 2.76 | |

Figure 2:
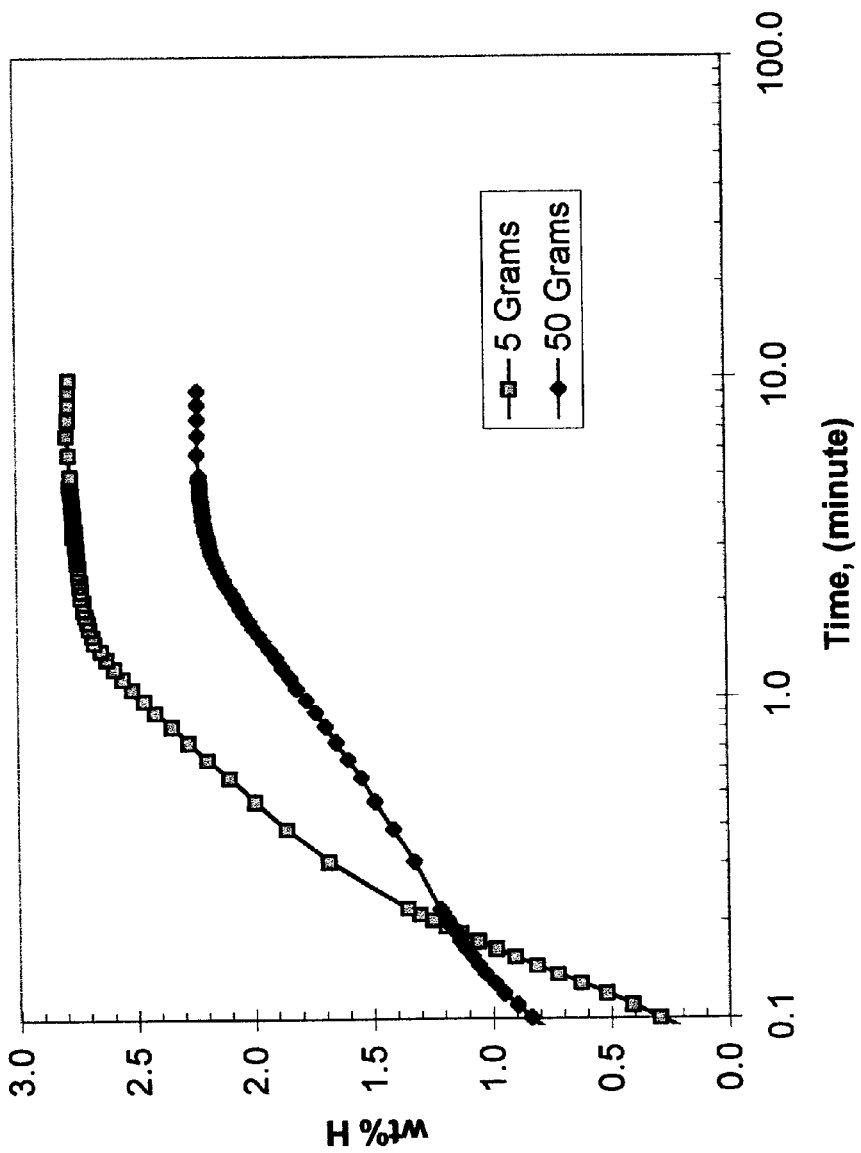
FIG. 2, shows the desorption kinetics of different size hydrogen storage alloy 3683-18 ingots of the present invention.

The hydrogen storage alloys of the present invention demonstrate hydrogen absorption capacities ranging from 3 to 4.2 weight percent hydrogen. FIG. 1, is a Pressure-Composition-Temperature (PCT) graph for one of the alloys of the present invention plotting pressure in PSIA on the y-axis versus weight percent of stored hydrogen on the x-axis at 25° C. The maximum absorption capacity of the alloy may be higher with an increase in pressure. Specifically shown is the PCT curve for alloy 3683-18. Desorption curves for samples of 3683-18 alloy at 150° C. are shown in FIG. 2. Shown in FIG. 2 is a 5 g sample of the 3683-18 alloy (■) and a 50 g sample of the 3683-18 alloy (♦). The smaller ingots exhibit a higher desorption capacity as compared to larger ingots of the same alloy. Smaller size ingots cool at a much faster rate as compared to the larger size ingots resulting in micro-structural or micro-chemical variation within the hydrogen storage alloy ingots giving rise to higher reversible capacity. To produce a hydrogen storage alloy with a higher reversible capacity, rapid solidification of the hydrogen storage alloy from molten liquid is preferred. The arts of rapid solidification may include melt-spinning and gas atomization processes.

Figure 3:
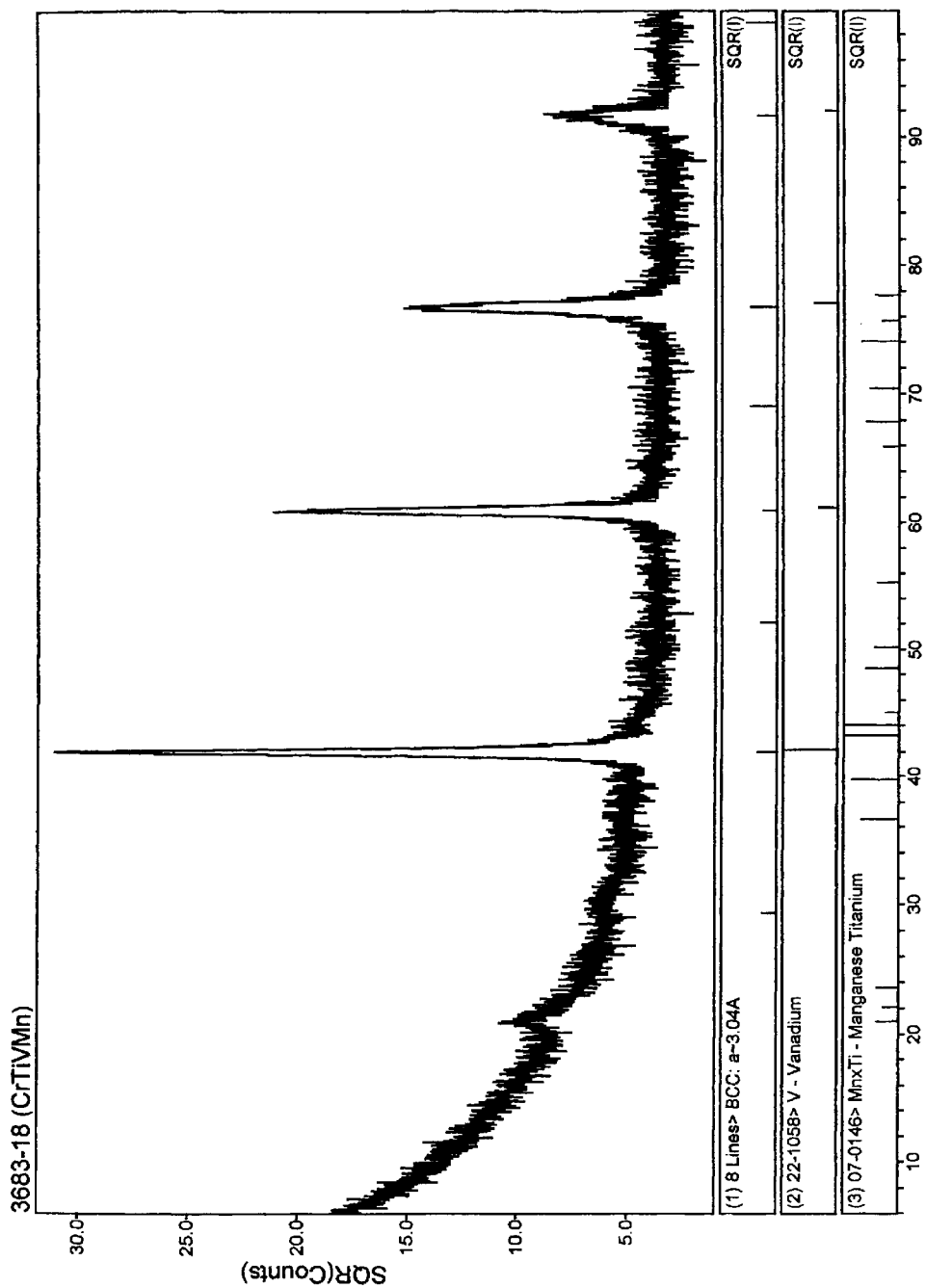
FIG. 3, shows a X-ray diffraction analysis of alloy 3683-18 of the present invention.

Alloys whose major elements include Ti, V, Cr, and. Mn form solid solution in broad composition ranges. Within the alloy, there are two intermetallic compounds competing with the formation of solid solution: TiCr$_2$ and TiMn$_2$. Unlike TiMn$_2$, a congruent compound that is thermally stable up to its melting point, TiCr$_2$ changes to body centered cubic solid solution at a temperature close to its melting point. High hydrogen absorption capacity is a characteristic of body centered cubic solid solution formed among such transition elements. FIG. 3, is a X-ray diffraction (XRD) analysis of alloy 3683-18. As shown by the XRD, the 3683-18 alloy has a body centered cubic structure.

Figure 4:
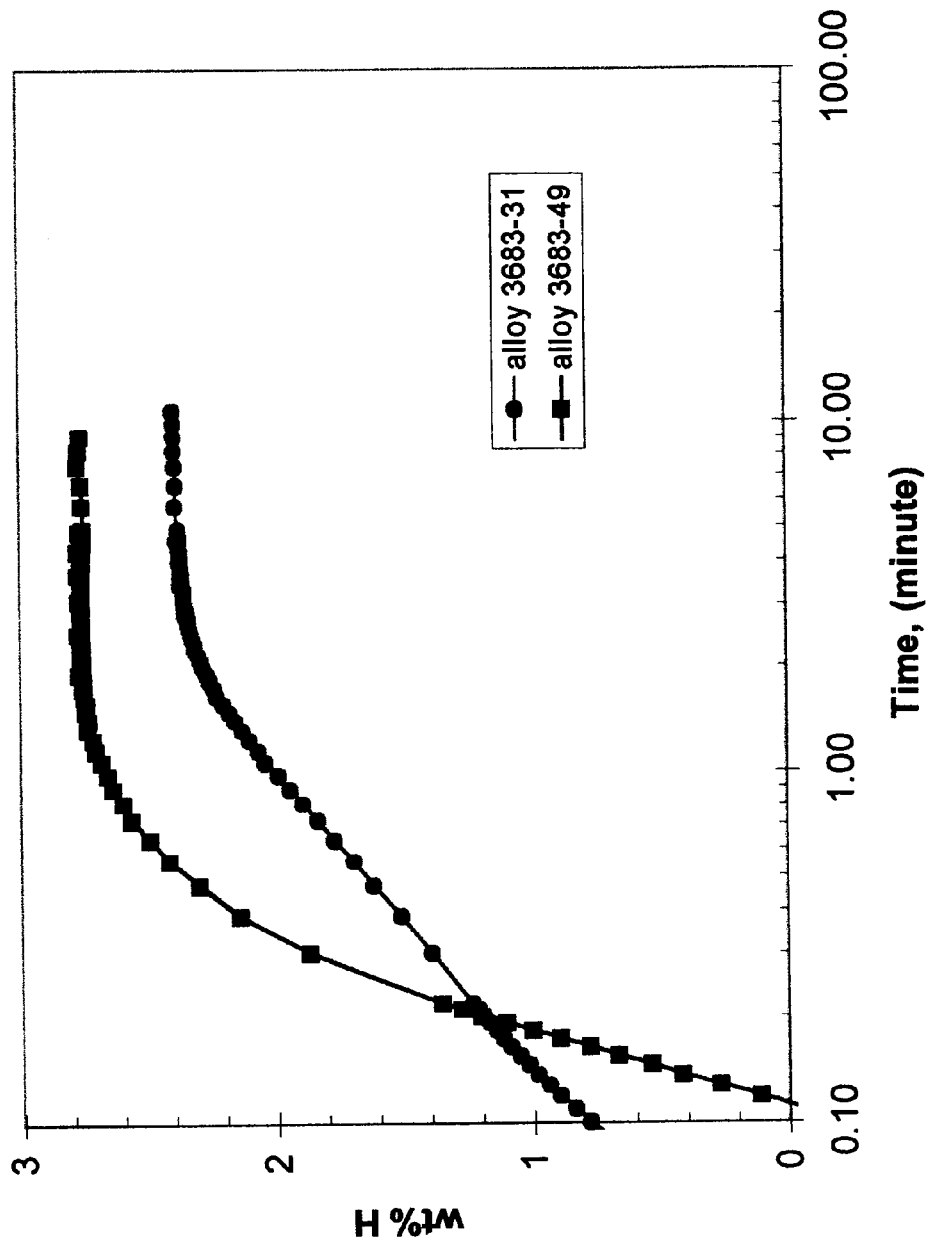
FIG. 4, shows the desorption kinetics of the hydrogen storage alloys 3683-31 and 3683-49 of the present invention.

The addition of molybdenum to the hydrogen storage alloy of the present invention improves the hydrogen desorption characteristics of the hydrogen storage alloy. Hydrogen storage alloys including 0.5 to 2 atomic percent molybdenum have demonstrated improved hydrogen desorption kinetics over similar alloys not incorporating the molybdenum. Preferably the hydrogen storage alloy includes 0.5 to 2.0 atomic percent molybdenum, most preferably the hydrogen storage alloy includes 0.5 to 1.5 atomic percent molybdenum. FIG. 4, shows the hydrogen desorption kinetics at 100° C. of hydrogen storage alloys of the present invention with and without molybdenum. Specifically shown is the 3683-31 alloy (●) and the 3683-49 alloy (■). The 3683-31 alloy does not contain any molybdenum whereas the 3683-49 alloy contains 0.59 atomic percent molybdenum.

The alloys of the present invention may be produced using arc melting, melt spinning, or gas atomization techniques, all of which are well known in the art. Other methods may be used provided they allow for rapid cooling of the alloy to form the micro-structural or micro-chemical variation within the hydrogen storage alloy giving rise to higher reversible capacity.

What is claimed is:
1. A hydrogen storage alloy comprising:
   29–54 atomic percent titanium;
   5–45 atomic percent vanadium;
   15–50 atomic percent chromium;
   9.75–15 atomic percent manganese; and
   greater than 0.0 up to 22 atomic percent of one or more of the elements selected from the group consisting of zirconium, yttrium, iron, nickel, zinc, molybdenum, and tantalum.
2. The hydrogen storage alloy according to claim 1, wherein said hydrogen storage alloy comprises 30 to 35 atomic percent titanium.
3. The hydrogen storage alloy according to claim 1, wherein said hydrogen storage alloy comprises 25 to 30 atomic percent vanadium.
4. The hydrogen storage alloy according to claim 1, wherein said hydrogen storage alloy comprises 25 to 30 atomic percent chromium.
5. The hydrogen storage alloy according to claim 1, said hydrogen storage alloy comprising zinc, wherein said zinc is present in an amount greater than 0 up to 10 atomic percent.
6. The hydrogen storage alloy according to claim 5, said hydrogen storage alloy comprising zinc, wherein said zinc is present in an amount greater than 0 up to 3 atomic percent.
7. The hydrogen storage alloy according to claim 1, said hydrogen storage alloy comprising iron, wherein said iron is present in an amount greater than 0 up to 10 atomic percent.
8. The hydrogen storage alloy according to claim 1, said hydrogen storage alloy comprising tantalum, wherein said tantalum is present in an amount greater than 0 up to 2 atomic percent.
9. The hydrogen storage alloy according to claim 1, said hydrogen storage alloy comprising yttrium, wherein said yttrium is present in an amount greater than 0 up to 2 atomic percent.
10. The hydrogen storage alloy according to claim 1, said hydrogen storage alloy comprising molybdenum, wherein said molybdenum is present in an amount greater than 0 up to 2 atomic percent.
11. The hydrogen storage alloy according to claim 10, wherein said hydrogen storage alloy comprises 0.5 to 1.5 atomic percent molybdenum.
12. The hydrogen storage alloy according to claim 11, wherein said hydrogen storage alloy comprises 0.5 to 1.0 atomic percent molybdenum.
13. A hydrogen storage alloy comprising:
   29–54 atomic percent titanium;
   5–45 atomic percent vanadium;
   15–50 atomic percent chromium;
   0–18 atomic percent manganese; and
   molybdenum.

14. The hydrogen storage alloy according to claim 13, wherein said hydrogen storage alloy comprises 30 to 35 atomic percent titanium.

15. The hydrogen storage alloy according to claim 13, wherein said hydrogen storage alloy comprises 25 to 30 atomic percent vanadium.

16. The hydrogen storage alloy according to claim 13, wherein said hydrogen storage alloy comprises 25 to 30 atomic percent chromium.

17. The hydrogen storage alloy according to claim 13, wherein said hydrogen storage alloy comprises 10 to 15 atomic percent manganese.

18. The hydrogen storage alloy according to claim 13, said hydrogen storage alloy comprising molybdenum, wherein said molybdenum is present in an amount greater than 0 up to 2 atomic percent.

19. The hydrogen storage alloy according to claim 18, wherein said hydrogen storage alloy comprises 0.5 to 1.5 atomic percent molybdenum.

20. The hydrogen storage alloy according to claim 19, wherein said hydrogen storage alloy comprises 0.5 to 1.0 atomic percent molybdenum.

21. A hydrogen storage alloy comprising:
29–54 atomic percent titanium;
5–45 atomic percent vanadium;
27.5–50 atomic percent chromium;
9.75–15 atomic percent manganese.

22. The hydrogen storage alloy according to claim 21, wherein said hydrogen storage alloy comprises 30 to 35 atomic percent titanium.

23. The hydrogen storage alloy according to claim 21, wherein said hydrogen storage alloy comprises 25 to 30 atomic percent vanadium.

24. The hydrogen storage alloy according to claim 21, wherein said hydrogen storage alloy comprises 27.5 to 30 atomic percent chromium.

\* \* \* \* \*

UNITED STATES PATENT AND TRADEMARK OFFICE
CERTIFICATE OF CORRECTION

| | | |
|---|---|---|
| PATENT NO. | : 6,616,891 B1 | Page 1 of 1 |
| APPLICATION NO. | : 10/247536 | |
| DATED | : September 9, 2003 | |
| INVENTOR(S) | : Sapru et al. | |

It is certified that error appears in the above-identified patent and that said Letters Patent is hereby corrected as shown below:

Please add the following Governmental rights section at the beginning of the specification.

STATEMENT REGARDING FEDERALLY SPONSORED RESEARCH OR DEVELOPMENT

This invention was made with Government support under Contract Number DE-FC36-97GO10212, awarded by the United States Department of Energy to Energy Conversion Devices, Inc. The Government has certain rights in this invention.

Signed and Sealed this

Twenty-ninth Day of August, 2006

JON W. DUDAS
*Director of the United States Patent and Trademark Office*

UNITED STATES PATENT AND TRADEMARK OFFICE
CERTIFICATE OF CORRECTION

PATENT NO.         : 6,616,891 B1
APPLICATION NO.    : 10/247536
DATED              : September 9, 2003
INVENTOR(S)        : Krishna Sapru et al.

It is certified that error appears in the above-identified patent and that said Letters Patent is hereby corrected as shown below:

Please insert statement below before 1st paragraph of patent:

--This invention was made with U.S. Government support under Contract No. DE-FG36-97GO10212 awarded by the U.S. Department of Energy. The Government has certain rights in this invention--

Signed and Sealed this

Fourth Day of December, 2007

JON W. DUDAS
*Director of the United States Patent and Trademark Office*